United States Patent
Zeng et al.

(10) Patent No.: US 7,643,939 B2
(45) Date of Patent: Jan. 5, 2010

(54) METHODS AND SYSTEMS FOR IMPLEMENTING AN ITERATED EXTENDED KALMAN FILTER WITHIN A NAVIGATION SYSTEM

(75) Inventors: Yueping Zeng, Lutz, FL (US); Jeffrey W. Kirkland, Redington Beach, FL (US); John F. Anderson, Oldsmar, FL (US); Lawrence J. Leftin, Satellite Beach, FL (US); Richard W. Briske, Kenneth City, FL (US)

(73) Assignee: Honeywell International Inc., Morristown, NJ (US)

( * ) Notice: Subject to any disclaimer, the term of this patent is extended or adjusted under 35 U.S.C. 154(b) by 491 days.

(21) Appl. No.: 11/370,442

(22) Filed: Mar. 8, 2006

(65) Prior Publication Data

US 2007/0213933 A1  Sep. 13, 2007

(51) Int. Cl.
*G01C 21/00* (2006.01)
(52) U.S. Cl. .................. 701/220; 701/200; 342/357.14
(58) Field of Classification Search ................ 701/200, 701/220, 213–215; 342/357.06, 357.09, 342/357.12, 357.14; 340/988
See application file for complete search history.

(56) References Cited

U.S. PATENT DOCUMENTS

| 5,051,751 | A | | 9/1991 | Gray |
| 5,184,304 | A | | 2/1993 | Huddle |
| 5,784,029 | A | * | 7/1998 | Geier ......................... 701/214 |
| 6,038,498 | A | * | 3/2000 | Briffe et al. ..................... 701/3 |
| 6,272,480 | B1 | | 8/2001 | Tresp et al. |
| 6,298,316 | B1 | * | 10/2001 | Diesel ......................... 702/190 |

(Continued)

FOREIGN PATENT DOCUMENTS

AU          4159093          1/1994

(Continued)

OTHER PUBLICATIONS

Sukkarieh, S.; "Low Cost, High Integrity, Aided Inertial Navigation Systems for Autonomous Land Vehicles", Ph.D. Thesis, Australian Centre for Field Robotics, Dept. of Mechanical and Mechatronic Engineering, The University of Sydney, Sydney, Australia, 2000.

(Continued)

*Primary Examiner*—Yonel Beaulieu
(74) *Attorney, Agent, or Firm*—Black Lowe & Graham PLLC

(57) ABSTRACT

A navigation system for a vehicle is described that includes an inertial measurement unit, a positioning unit, and a processing unit. The inertial measurement unit configured to provide a first set of data relating to operation of the vehicle and the positioning unit is configured to provide a second set of data relating to operation of the vehicle. The processing unit is configured to receive the data sets provided by the inertial measurement unit and the positioning unit and the processing unit comprises an error processing device. The error processing device is programmed with time updating error states and measurement updating error states relating to the data sets received by said processing unit and is configured to iterate both the time updating error states and the measurement updating error states based on a first criteria and iterate only the measurement updating error states based on a second criteria.

17 Claims, 3 Drawing Sheets

U.S. PATENT DOCUMENTS

| | | |
|---|---|---|
| 6,401,036 B1 | 6/2002 | Geier et al. |
| 6,417,802 B1 | 7/2002 | Diesel |
| 6,433,736 B1 | 8/2002 | Timothy et al. |
| 6,535,821 B2 | 3/2003 | Wang et al. |
| 6,631,323 B2 | 10/2003 | Tucker et al. |
| 6,826,478 B2 | 11/2004 | Riewe et al. |
| 6,859,170 B2 | 2/2005 | Devereux et al. |
| 6,900,760 B2 | 5/2005 | Groves |
| 2003/0216865 A1 | 11/2003 | Riewe et al. |
| 2005/0192745 A1 | 9/2005 | Abraham et al. |
| 2007/0156338 A1 | 7/2007 | Coatantiec et al. |

FOREIGN PATENT DOCUMENTS

| | | |
|---|---|---|
| WO | WO9612973 | 5/1996 |

OTHER PUBLICATIONS

Lerro, D. and Bar-Shalom, Y.; "Tracking with De-biased Consistent Converted Measurements Versus EKF", IEEE Transaction /Aerospace & Electronic Systems, 29(3); 1015-1022, 1993.

Mahendra Mallick and Sanjeev Arulampalam; "Comparison of Non-linear Filtering Algorithms in Ground Moving Target Indicator (GMTI) Tracking", San Diego, CA, vol. 5204, Aug. 2003.

Rudolph Van Der Merwe and Eric A. Wan B.L. Evan; "Efficient Derivative-Free Kalman Filters for Online Learning", European Symposium , Aritficial Neural Networks, Belgium, Apr. 2001.

Larry J. Levy; The Kalman Filter: Navigation's Integration Workhorse, Johns Hopkins University, Applied Physics Laboratory; © 1998 Advanstar Communications; 12 pgs.

* cited by examiner

US 7,643,939 B2

METHODS AND SYSTEMS FOR IMPLEMENTING AN ITERATED EXTENDED KALMAN FILTER WITHIN A NAVIGATION SYSTEM

BACKGROUND OF THE INVENTION

This invention relates generally to navigation systems, and more specifically, to methods and systems for implementing an iterated, extended Kalman filter within an INS/GPS based navigation system.

Navigation systems are but one example of nonlinear dynamic systems. One of the problems associated with navigation system development is the estimation of the various states of the dynamic system. Such estimations typically utilize navigation system software. The extended Kalman filter (EKF) has been used within navigation system software to make such estimations. In some navigation systems, the EKF applies a Taylor series expansion for nonlinear system and observation equations, and utilizes first order terms to apply the well-known linear Kalman filter theory, where the probability density function (PDF) is assumed to be Gaussian.

In practice, however, the EKF has shown several limitations. One of the limitations is that only small errors are allowed to be input into the EKF. Otherwise, in the presence of nonlinear error behavior, the first-order approximations can cause biased solutions and inconsistencies in updating of the covariance matrix, which can lead to filter instability. While second-order versions of the EKF exist, their increased implementation and computation complexity tend to prohibit their use.

A popular technique to improve the first-order approach is the iterated EKF, which effectively iterates the EKF equations at the current time observation by redefining the nominal state estimate and re-linearizing the measurement equations. The iterated EKF is capable of providing better performance than the basic EKF, especially in the case of significant nonlinearity in the measurement function.

Recently, low-cost MEMS-based sensors have become available and affordable for utilization in inertial navigation systems (INS). Such INS applications include airplane navigation, determination of position, and guidance. Most navigation systems contain a GPS range measuring device and an INS which provides data relating to an angular velocity, velocity, and azimuth measuring, which are used in combination to measure the motion of the mobile object (e.g., airplane). The navigation systems also contain range error estimating devices. Based on the output of the error estimating devices, position of the mobile object can be determined. The error estimating devices are sometimes implemented using Kalman filters and averaging processes.

The output of the various measuring devices are thereby corrected using Kalman filters and the like so that the position of the mobile object can be estimated with a relatively high level of accuracy without using a high precision sensor. However, due to the nature of high noise, nonlinear effects, and imprecise measurements associated with low cost MEMS sensors, traditional EKF estimation will degrade with time and become unreliable. Therefore, the accuracy of the INS is limited, especially when GPS data is not available. Most nonlinear Kalman filters can be used to improve an estimation error, however, such implementations are difficult. More specifically, such implementations are difficult to tune and additionally it is difficult to switch estimation schemes because the nonlinear effect only shows up in certain scenarios.

Therefore, there still exists an unfulfilled need for a low cost navigation system that provides accuracy at levels similar to that of currently available, more expensive navigation systems.

BRIEF SUMMARY OF THE INVENTION

In one aspect, a navigation system for a vehicle is provided that includes an inertial measurement unit configured to provide a first set of data relating to operation of the vehicle and a positioning unit configured to provide a second set of data relating to operation of the vehicle. The navigation system further includes a processing unit configured to receive the data sets provided by the inertial measurement unit and the positioning unit. The processing unit further includes an error processing device programmed with time updating error states and measurement updating error states relating to the data sets received by the processing unit. The error processing device is configured to iterate both the time updating error states and the measurement updating error states based on a first criteria and iterate only the measurement updating error states based on a second criteria. The processing unit is configured to estimate at least a position and a velocity of the vehicle based on the updated error states.

In another aspect, a method for providing an estimate of position for an object is provided. The method includes receiving sensor data from a plurality of external sources, determining if the data received from at least one of the external sources is indicative of the object changing position, iterating both time updating error states and measurement updating error states for the received sensor data to determine a position of the object if the data is not indicative of a changing position, and iterating measurement updating error states for the received sensor data to determine a position of the object if the data is indicative of a changing position.

In still another aspect, a Kalman filter programmed with time updating error states and measurement updating error, states relating to received data sets is provided. The Kalman filter is configured to iterate both the time updating error states and the measurement updating error states based on a first criteria, and iterate only the measurement updating error states based on a second criteria.

DETAILED DESCRIPTION OF THE INVENTION

Figure 1:
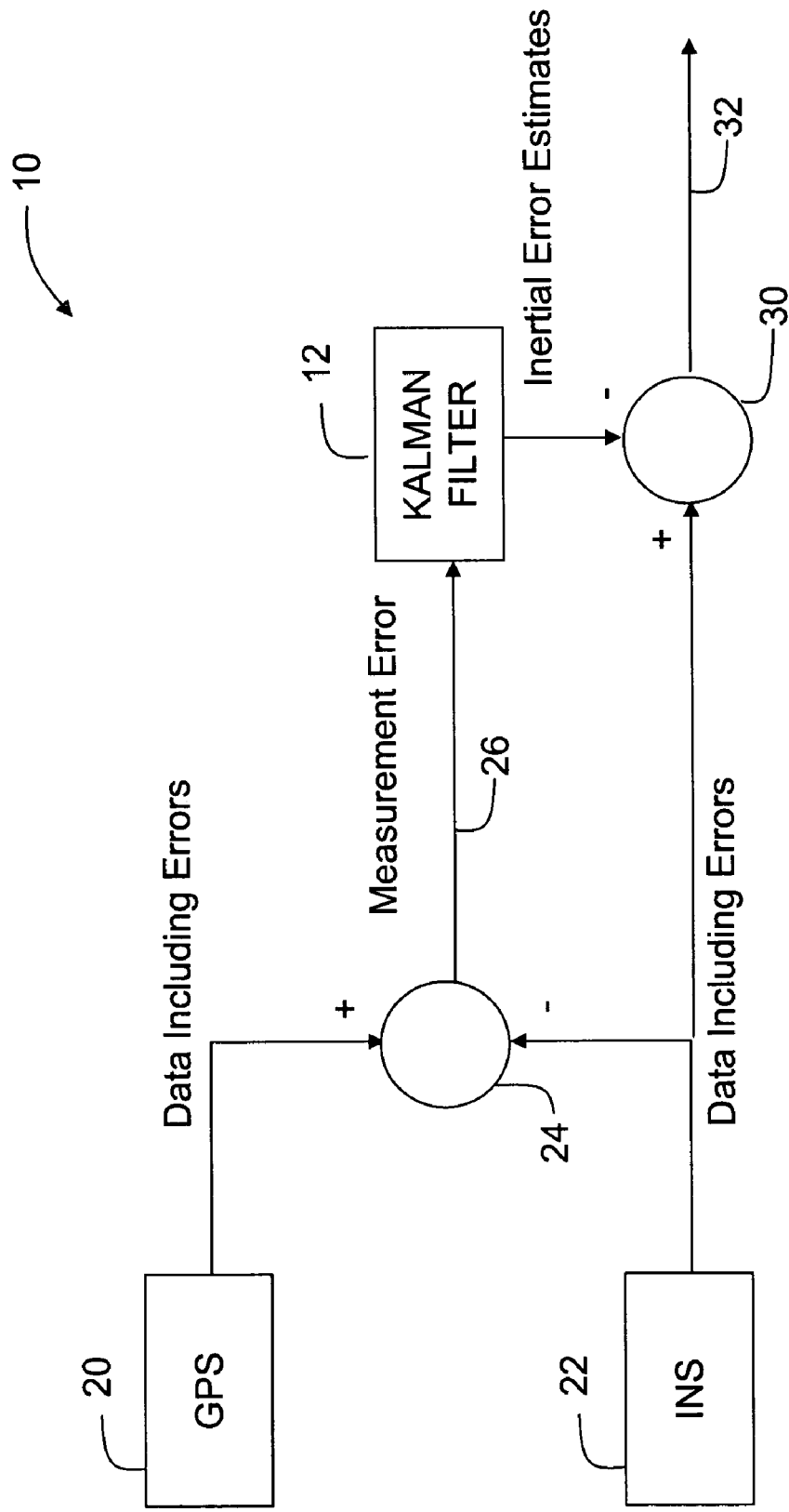
FIG. 1 is a block diagram of a Kalman filter implementation within a navigation system.

FIG. 1 is a block diagram of a navigation system 10 incorporating a Kalman filter 12. Navigation system 10 includes a global positioning system (GPS) 20 and an inertial navigation system (INS) 22. GPS data from GPS 20 and sensor data from INS 22 is provided to a summing device 24. The GPS data includes GPS measurement errors and the sensor data includes inertial errors. Summing device 24 subtracts sensor data from INS 22 from GPS data from GPS 20 and outputs a measurement error 26. The measurement error 26 is input into Kalman filter 12 which, based upon previously provided measurement errors, calculates inertial error estimates that are provided to a summing device 30. Summing device 30 also receives sensor data from INS 22. The inertial error estimates are subtracted from the sensor data from INS 22, which includes inertial errors, in summing device 30 which outputs a position estimate 32 in which at least a portion of the errors associated with a determination of position using an inertial system have been reduced through utilization of data originating from GPS 20.

In operation, Kalman filter 12 is programmed with error states based on the tolerances of the data received, for example, from GPS 20 and INS 22. One example of an error state is the inaccuracies between the atomic clocks in the satellites of the GPS and the less accurate clocks in GPS receivers. In one embodiment, Kalman filter 12 is an extended Kalman filter (EKF). As described above, if large errors are input into the EKF, along with nonlinear error behavior, first-order approximations may result in biased inertial error estimates and inconsistencies in a covariance matrix update. The approximations may thus lead to instability in the EKF. Sources of non-linear error include, for example, a latency of GPS data, based on a position of the satellites with respect to the position of GPS receiver 22. As mentioned above, implementation and computation complexity associated with second-order versions of the EKF tend to prohibit their use.

Figure 2:
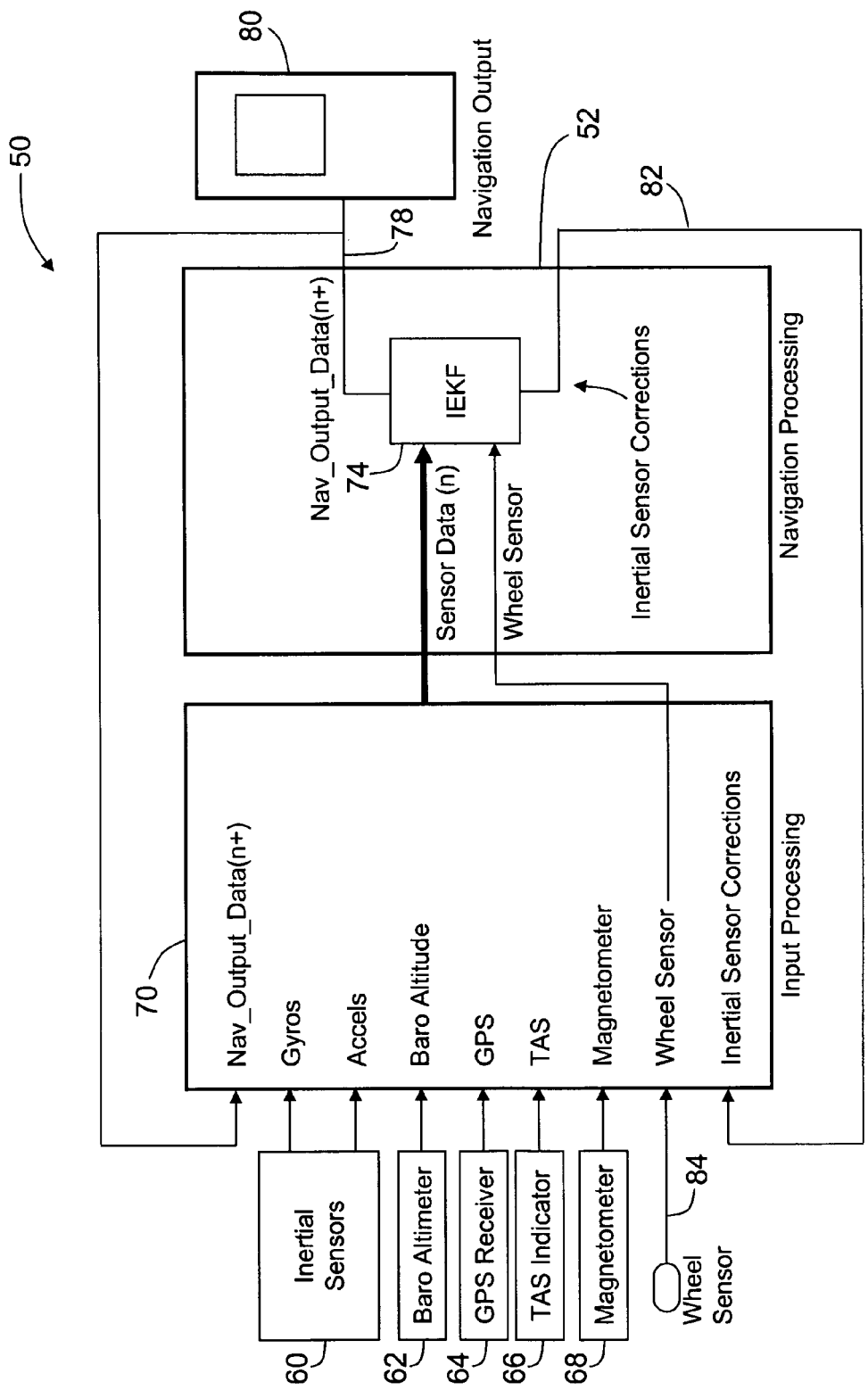
FIG. 2 is a block diagram of a multiple input navigation system incorporating an iterated Kalman filter operable to provide a position solution in a number of operating modes.

FIG. 2 is a block diagram of a navigation system 50 which includes a navigation processor 52 configured to dynamically switch between Kalman filter implementations in order to at least partially address the problems associated with processing of non-linear errors as described above. In one embodiment, dynamically switching between Kalman filter implementations is utilized to address problems associated with gyroscope compass alignment times. Specific to navigation systems implementations, this dynamic switching provides navigation processor 52 with a capability to counter nonlinear effects in received inertial data when estimating a position and reduce gyroscope compass alignment times for navigation system 50.

Still referring to FIG. 2, navigation system 50 includes inertial sensors 60 having, for example, MEMS-based gyroscopes and accelerometers, a barometric altimeter 62, a GPS receiver 64, a true airspeed (TAS) indicator 66, and a magnetometer 68. An input processing unit 70 processes the data from the listed sensing devices and outputs the combined sensor data 72 to navigation processor 52. Navigation processor 52 utilizes an iterated, extended Kalman filter (IEKF) 74 to remove errors from the combined sensor data 72 and provide accurate navigational output data 78 to a navigation display device 80 and back into input processing unit 70. Kalman filter 74 also provides inertial sensor corrections 82 back into input processing unit 70. Input processing unit 70 also processes the data from inertial sensors 60 and outputs the combined sensor data 72 to navigation processor 52. Navigation processor 52 utilizes a Global iterated, extended Kalman filter (G-IEKF) to reduce the alignment time when operating in a gyroscope compass mode.

Kalman filter 74 is initialized with at least position and velocity error states, in one embodiment, and incorporates an estimation technique which provides an estimate of navigation system errors. The estimation technique includes a calculation of a Kalman gain matrix which relates an accuracy of a current measurement received from one or more of the sensors 60, 62, 64, 66, and 68 to that of the previous estimates of errors associated with the sensors 60, 62, 64, 66, and 68.

In one embodiment, a wheel sensor signal 84 received by navigation system 50 is indicative of whether the air vehicle incorporating navigation system 50 is on the ground. Wheel sensor signal 84, in the illustrated embodiment, is provided to Kalman filter 74. An indication that the air vehicle is on the ground is sometimes referred to as a stationary case, and alignment of the gyroscope compass is typically performed when the vehicle is stationary. In a specific embodiment, Kalman filter 74 utilizes a state of wheel sensor signal 84 to switch to and from iteration of both time updating error states and measurement updating error states (a global iterated, extended Kalman filter (G-IEKF) mode) of sensors 60, 62, 64, 66, and 68 and iteration of only the measurement updating error states (an iterated, extended Kalman filter (IEKF) mode) of sensors 60, 62, 64, 66, and 68. While described herein in terms of wheel sensor 84, those skilled in the art will readily understand that signals and combinations of data from sensors may also be utilized to switch Kalman filter 74 between iteration of both time updating error states and measurement updating error states of sensors 60, 62, 64, 66, and 68 and iteration of only the measurement updating error states of sensors 60, 62, 64, 66, and 68.

As described above, navigation system 50 is a highly accurate, real-time system that incorporates an iterated, extended Kalman filter (IEKF) 74. IEKF 74, as further described herein, is configured to operate as both a linear basic Kalman filter, performing a single iteration, as well as a nonlinear Kalman filter performing several iterations. The determination between a single iteration and multiple iterations is based upon one or more conditions received, for example, at input processing device 70. The determination may also be based upon results from residues, co-variance matrix values, differences between error states, or one or more signals received at input processing device 70. During navigation, sensor data received from sensors 60, 62, 64, 66, and 68 constantly changes, with characteristics that exhibit both linear and nonlinear tendencies. System 50 is configured to dynamically characterize the nonlinear tendencies and adapt Kalman filter 74 based on the convergence information. System 50 is also configured to switch the mode between stationary and non-stationary cases to adapt Kalman filter 74 between a G-IEKF mode of operation and an IEKF mode of operation.

By utilizing the herein described Kalman filter 74, the nonlinear effects associated with various error states are reduced and the nonlinear Kalman filter can be dynamically turned on or off based on the convergence conditions. Stated differently, Kalman filter 74 within system 50 will adapt and perform iterations as either a Global iterated, extended Kalman filter or as an iterated, extended Kalman filter based on sensor behavior or other signals received by system 50. One such sensor behavior analysis included a comparison of a current error state vector with a previous error state vector. More specifically, comparing a gyroscope data and error from a first and second error state iteration is utilized in one embodiment to determine whether in which mode the Kalman filter 74 will operate. Such an analysis includes a decision as to whether the sensor behavior is linear or non-linear as a function of error magnitude, and may further include a calibration of the gyroscope nonlinearity with an iteration time of the Kalman filter 74. Such embodiments are thought to improve the accuracy of position determinations made by system 50.

The basic formulas for iterated, extended Kalman filter are as follows:

Time update prediction (global):
State estimation propagation $$\hat{x}_{k|k-1} = F_{k,k-1} \hat{x}_{k-1|k-1} \tag{1}$$

Error covariance propagation $$P_{k|k-1} = F_{k|k-1} P_{k-1|k-1} F^T_{k,k-1} + Q_{k,k-1} \tag{2}$$

Measurement update (global+local):
Initialization for state estimation $$\hat{x}^0_{k|k} = \hat{x}_{k|k-1} \quad (3)$$

State estimate update $$\hat{x}^{i+1}_{k|k} = \hat{x}^i_{k|k-1} + K^i_k[z_k - h(\hat{x}^i_{k|k}) - H_k(\hat{x}^i_{k|k})(\hat{x}_{k|k-1} - \hat{x}^i_{k|k})],$$
$$i = 0, 1, 2, \quad (4)$$

Kalman gain update $$K^i_k = P_{k|k-1} H^T_k(\hat{x}^i_{k|k})[H_k(\hat{x}^i_{k|k}) P_{k|k-1} H^T_k(\hat{x}^i_{k|k}) + R_k]^{-1} \quad (5)$$

Error covariance update $$P^{i+1}_{k|k} = P_{k|k-1} - K_k(\hat{x}^i_{k|k}) H_k(\hat{x}^i_{k|k}) P_{k|k-1} \quad (6)$$

In the above, x is the state vector, F is the state transition matrix, P is the covariance matrix, Q is the covariance of dynamic disturbance noise, R is the covariance of measurement noise, H is the measurement sensitivity matrix, and K is the Kalman gain. The index "i" is used for iteration and k is the time related index. As can be determined from equations (1)-(6), for a local iterated, extended Kalman filter implementation, only measurement equations (4)-(6) are updated during iteration.

However, for a global iterated, extended Kalman filter implementation, is applied to all the observed data. Due to the back propagation of the state estimate, a global iterated, extended Kalman filter implementation is utilized, in one embodiment, for gyro compass alignment. The basic formulas for the global iterated, extended Kalman filter implementation is similar to those of a local extended Kalman filter implementation except that for global iteration both time prediction equations (1)-(2) and measurement equations (4)-(6) are updated. While keeping the time step as "virtual time" during global iteration, the number of measurements can be reduced for stationary case and the alignment time will be much shorter when compared with that of the traditional extended Kalman filter approach. When convergence is achieved, iteration is stopped.

During iteration, residues in the measurement equations that are utilized to determine the error states provide direction as to what is needed to reduce the errors. Additionally, a Kalman gain associated with Kalman filter 74 is factored when determining a size of the step to the next error state determinations. Specifically, Kalman filter 74 reduces gyroscope compass alignment time by iterating both time updating equations and measurement updating equations. Such iterations are substantially equivalent to using a short time step when utilizing a basic extended Kalman filter. Due to noise levels present in the data from various inexpensive sensors, for example, data from micro electromechanical systems (MEMS) based inertial systems, the time step for the extended Kalman filter cannot be made too small. However, such a time step may be used to measure the nonlinearity for the sensor data during calibration.

Another criterion to measure the nonlinearity is the comparison of a current error state vector with a previous error state vector. For example, a first iteration for an iterated, extended Kalman filter is identical with the basic extended Kalman filter. If this first iteration does not cancel the nonlinear effects of the received sensor data, more iterations will be performed by the filter. In one embodiment, and referring back to FIG. 2, real-time navigation system 50 is configured with two rate processors (not shown) to accommodate these iterations. One rate processor is utilized for implementation of the above described Kalman filter and operates at a comparatively slow rate, while the other rate processor is a high rate processor utilized for sensor data updates. Within the Kalman filter implementation, in one embodiment, a for-loop is used to perform the iteration. During iterations, except for the sensor data measurements, other navigation parameters are updated including error state vector and dynamic covariance.

Figure 3:
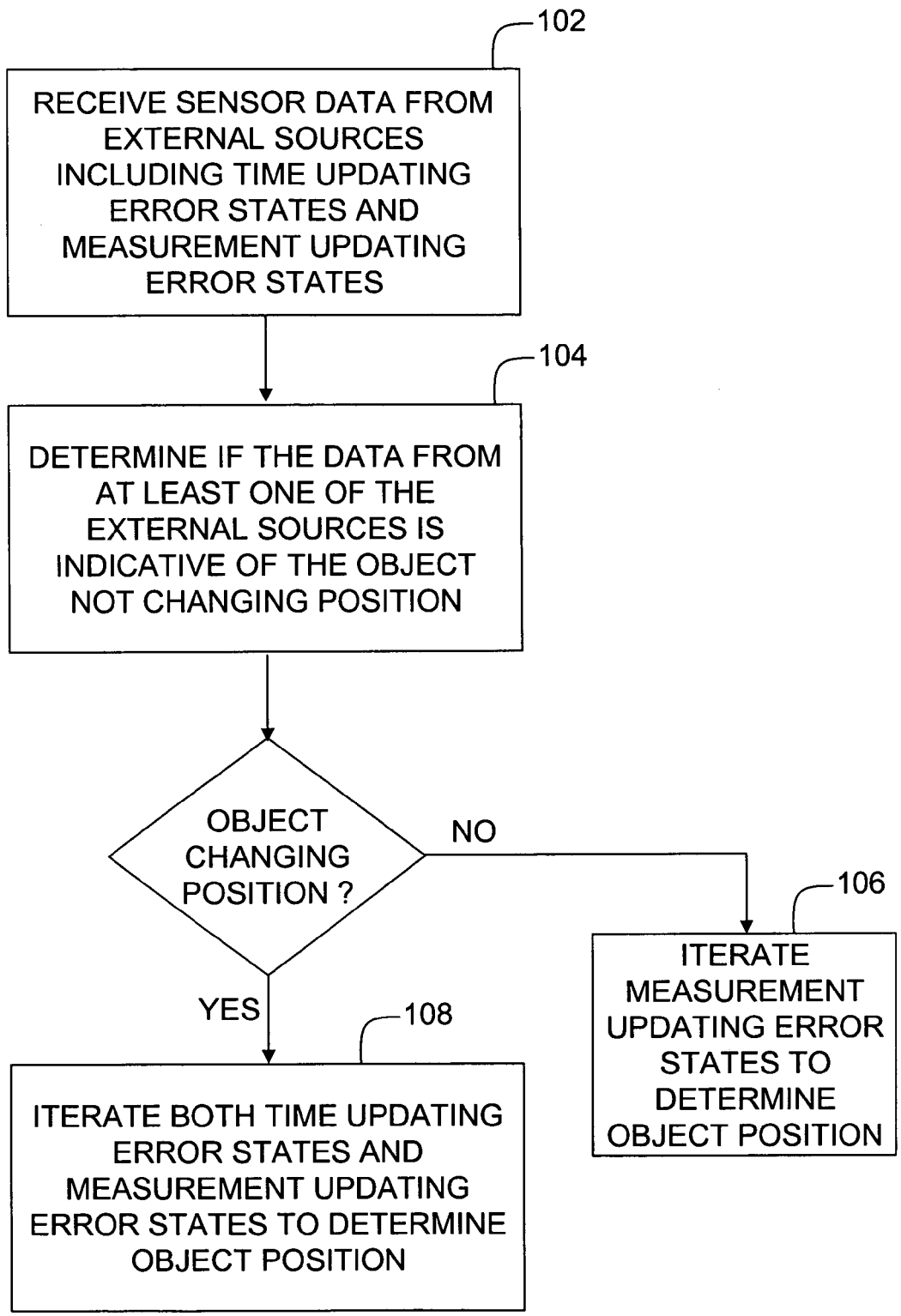
FIG. 3 is a flowchart illustrating operation of the Kalman filter in the navigation system of FIG. 2.

FIG. 3 is a flowchart 100 illustrating the process performed by Kalman filter 74 in a specific embodiment, for example, a process for providing an estimate of position for an object. Kalman filter 74 receives 102 sensor data from external sources (i.e., sensors 60, 62, 64, 66, 68, and 84). At least some of the sensor data includes time updating error states and measurement updating error states. Kalman filter 74 is further configured to determine 104 if the data from at least one of the external sources is indicative of the object not changing position.

If it appears the object is changing position, for example, only measurement updating error states are iterated 106 to remove nonlinear effects and an iteration number will be dynamically changed according to the convergence conditions. If it appears the object is not changing position (previously referred to herein as a stationary case), both time updating error states and measurement updating error states are iterated 108 to reduce the gyroscope compass alignment time.

As described above and in one embodiment, a method for providing an integration of INS data, GPS data, and other sensor data with an iterated, extended Kalman filter is described as well as an INS/GPS based navigation system that incorporates the iterated, extended Kalman filter for real-time integration of the sensor data from the INS, GPS, and other sensors. The described navigation system includes other sources of sensor data which are processed by the Kalman filter, for example, true airspeed and barometric altimeter data. The navigation system is more robust than known INS/GPS based navigation systems, based on operation of the iterated, extended Kalman filter. Additional robustness is further based on the ability of the Kalman filter to account for latency in updates received from the GPS and the non-linear functionality of, for example, the barometric altimeter, whose error states are also developed by the iterated, extended Kalman filter.

Such latencies and nonlinearities are typically inaccurate or not practical when error states for such devices are attempted to be developed with traditional extended Kalman filters. The embodiments described herein for the iterated, extended Kalman filter reduce nonlinear effect during the process of estimating state vectors. Specifically, a nonlinear processing capability of the Kalman filter can be dynamically turned on or off based on signals or other sensor data received by the navigation system. Therefore, navigation system 50 which includes iterated, extended Kalman filter 74 adapts between operation as an extended Kalman filter where only one iteration is needed and an iterated, extended Kalman filter where more iterations are needed based on, for example, the convergence conditions associated with the iterated data.

Navigation system 50 also includes a Kalman filter 74 configured to adapt between operation as a global iterated, extended Kalman filter (G-IEKF) where both time updating and measurement updating are used, for example, to reduce the gyroscope compass alignment time and operation as an iterated, extended Kalman filter (IEKF) where only measurement equations are updated to cancel nonlinear effects. The G-IEKF mode of operation includes iteration of both time updating and measurement updating equations within the Kalman filter in order to reduce effects of nonlinearity more effectively for stationary measurements. As described above, one example of such a stationary measurement is the ground alignment of a gyroscope compass.

While described herein in terms of navigation system operation, it should be understood that the embodiments described herein are applicable for utilization in other Kalman filter based systems. Specifically, a Kalman filter that is operable to adapt between operation as an extended Kalman filter, where only one iteration is needed, and an iterated, extended Kalman filter where more iterations are needed based on, for example, the convergence conditions associated with the data to be iterated is believed to have applications in any system utilizing state estimations.

While the invention has been described in terms of various specific embodiments, those skilled in the art will recognize that the invention can be practiced with modification within the spirit and scope of the claims.

What is claimed is:

1. A navigation system for a vehicle comprising:
   an inertial measurement unit configured to provide a first set of data relating to operation of the vehicle;
   a positioning unit configured to provide a second set of data relating to operation of the vehicle; and
   a processing unit configured to receive the data sets provided by said inertial measurement unit and said positioning unit, said processing unit comprising an error processing device programmed with time updating error states and measurement updating error states relating to the data sets received by said processing unit, said error processing device configured to iterate both the time updating error states and the measurement updating error states based on a first criteria and iterate only the measurement updating error states based on a second criteria, said processing unit further configured to estimate at least a position and a velocity of the vehicle based on the updated error states.

2. A navigation system according to claim 1 wherein said error processing device comprises a Kalman filter.

3. A navigation system according to claim 1 wherein said inertial measurement unit comprises at least one of a gyroscope and an accelerometer configured to provide acceleration data and angular velocity data for the vehicle.

4. A navigation system according to claim 1 wherein said positioning unit comprises a global positioning system configured to provide position data, velocity data, and altitude data for the vehicle based on pseudo-range measurements.

5. A navigation system according to claim 1 wherein a determination between the first criteria and the second criteria is based on one or more signals received from the vehicle.

6. A navigation system according to claim 5 wherein the signals received from the vehicle comprise one or more of a wheels down signal, a weight on wheels signal, and a brake signal.

7. A navigation system according to claim 1 wherein said processing unit is further configured to receive data from one or more of a barometric altimeter, a true airspeed indicator, and a magnetometer.

8. A navigation system according to claim 1 wherein said processing unit comprises a Kalman filter initialized with at least position and velocity error states.

9. A navigation system according to claim 1 wherein the first criteria comprises data not indicative of a changing position for the vehicle and the second criteria comprises data indicative of a changing position for the vehicle.

10. A method for providing an estimate of position for an object, said method comprising:
    receiving sensor data from a plurality of external sources;
    determining if the data received from at least one of the external sources is indicative of the object changing position;
    iterating measurement updating error states using the received sensor data to determine a position of the object if the data is indicative of a changing position; and
    iterating both time updating error states and measurement updating error states using the received sensor data to determine a position of the object if the data is not indicative of a changing position.

11. A method according to claim 10 wherein receiving sensor data from a plurality of external sources comprises receiving sensor data from at least a GPS and an inertial navigation system.

12. A method according to claim 10 wherein determining if the data received from at least one of the external sources is indicative of the object not changing position comprises determining a state of one or more signals received from the object.

13. A method according to claim 10 wherein determining if the data received from at least one of the external sources is indicative of the object changing position comprises comparing a current error state vector with a previous error state vector.

14. A method according to claim 13 wherein comparing a current error state vector with a previous error state vector comprises comparing a gyroscope data and error from a first and a second error state iteration.

15. A method according to claim 10 wherein determining if the data received from at least one of the external sources is indicative of the object changing position comprises determining whether the sensor behavior is linear or non-linear as a function of error magnitude.

16. A method according to claim 15 further comprising calibrating a gyroscope nonlinearity with a time step of a Kalman filter.

17. A method according to claim 10 wherein determining if the data received from at least one of the external sources is indicative of the object changing position comprises determining if the received data is gyroscope compass alignment data.

* * * * *

UNITED STATES PATENT AND TRADEMARK OFFICE
CERTIFICATE OF CORRECTION

| | | |
|---|---|---|
| PATENT NO. | : 7,643,939 B2 | Page 1 of 1 |
| APPLICATION NO. | : 11/370442 | |
| DATED | : January 5, 2010 | |
| INVENTOR(S) | : Zeng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 794 days.

Signed and Sealed this

Sixteenth Day of November, 2010

David J. Kappos
*Director of the United States Patent and Trademark Office*